United States Patent [19]
Moniwa et al.

[11] Patent Number: 5,492,633
[45] Date of Patent: Feb. 20, 1996

[54] WATER TREATMENT PROCESS WITH OZONE

[75] Inventors: Takeo Moniwa, Machida; Mitsumasa Okada, Kukizaki; Nobuyuki Motoyama, Kawasaki; Takayuki Morioka, Kawasaki; Yasuji Shimizu, Kawasaki; Ryutaro Takahashi, Kawasaki, all of Japan

[73] Assignee: Fuji Electric Co., Ltd., Kanagawa, Japan

[21] Appl. No.: 411,071

[22] Filed: Mar. 27, 1995

Related U.S. Application Data

[63] Continuation of Ser. No. 41,225, Mar. 31, 1993, abandoned.

[30] Foreign Application Priority Data

Apr. 1, 1992 [JP] Japan .................................. 4-078083
Oct. 21, 1992 [JP] Japan .................................. 4-282093

[51] Int. Cl.⁶ .................................. C02F 1/72; C02F 1/78
[52] U.S. Cl. ........................ 210/760; 210/763; 210/908; 210/909
[58] Field of Search ..................... 210/758, 760, 210/763, 762, 908, 909

[56] References Cited

U.S. PATENT DOCUMENTS

| | | | |
|---|---|---|---|
| 2,951,797 | 9/1960 | Sharp | 210/763 |
| 3,240,737 | 3/1966 | McKennon | 210/758 |
| 4,846,978 | 7/1989 | Leggett et al. | 210/760 |
| 4,997,571 | 3/1991 | Roensch et al. | 210/760 |
| 5,043,080 | 8/1991 | Cater et al. | 210/748 |
| 5,120,453 | 6/1992 | Frame et al. | 210/763 |
| 5,126,111 | 6/1992 | Al-Ekabi et al. | 210/763 |
| 5,133,875 | 7/1992 | Carnahan | 210/752 |
| 5,137,642 | 8/1992 | Castrantas et al. | 210/904 |
| 5,139,679 | 8/1992 | Pan et al. | 210/748 |
| 5,154,836 | 10/1992 | Cloug | 210/747 |
| 5,156,748 | 10/1992 | Meunier et al. | 210/759 |
| 5,160,636 | 11/1992 | Gilles et al. | 210/763 |
| 5,205,940 | 4/1993 | Graetzel | 210/748 |
| 5,232,604 | 8/1993 | Swallow et al. | 210/760 |
| 5,238,581 | 8/1993 | Frame et al. | 210/760 |
| 5,266,214 | 11/1993 | Safarzedeh-Amiri | 210/748 |
| 5,348,665 | 9/1994 | Schulte et al. | 210/748 |
| 5,382,337 | 1/1995 | Wlassics et al. | 210/748 |
| 5,417,852 | 5/1995 | Furness, Jr. et al. | 210/188 |

*Primary Examiner*—Cynthia L. Nessler
*Attorney, Agent, or Firm*—Finnegan, Henderson, Farabow, Garrett & Dunner

[57] ABSTRACT

A process for the treatment of water with ozone in which trace amounts of organic substances contained in water to be treated are oxidized and decomposed by diffusing ozone into the water introduced into a reaction tank, by injecting a chelate compound into the water to be treated after or just before the introduction of the water into the reaction tank. Preferred chelate compounds include ethylenediaminetetraacetic acid disodium salt, ethylenediaminetetraacetic acid calcium salt, ethylenediaminetetraacetic acid magnesium salt, ethylenediaminetetraacetic acid iron salt and iron citrate.

18 Claims, 5 Drawing Sheets

WATER TREATMENT PROCESS WITH OZONE

This application is a continuation of application Ser. No. 08/041,225 filed Mar. 31, 1993, now abandoned.

BACKGROUND OF THE INVENTION

1. Field of the Invention

This invention relates to a water purifying process which is an ozone treatment for removing trace amounts of organic substances contained in water. The invention further relates to a method of treating water by injecting a chelate compound and then diffusing ozone therein.

2. Discussion of the Related Art

With the rapidly growing public interest in water, various water treatment processes have been examined. The purposes of these processes include obtaining safe and good-tasting water in the area of commercial drinking water and high clarity water from the recycling of sewage. In the case of commercial drinking water or service water, tap water sometimes generates musty odors caused by the eutrophication of rivers and lakes used as the source of the water supply. This problem is caused by so-called "musty odor substances" such as geosmin, dimethylisoborneol (to be referred to as "2-MIB" hereinafter) and the like which are produced by blue-green algae and generate musty odors when in extremely low minimum concentrations in the range of about 5 to 20 ng/l.

Although adsorption treatment with active carbon is carried out at most of the purification plants as a countermeasure to solve this problem, such a treatment is costly because of the need for increased amounts of active carbon and complex handling requirements. As an alternative to active carbon processes, advanced treatment methods such as ozone treatment, biological water treatment and the like, have been examined. In the case of sewage treatment, advanced treatment methods such as ozone treatments, membrane treatment and the like, have been examined both from a load-reduction viewpoint at the purification plant and an environmental viewpoint. Potential uses for purified sewer water include as wash water for use in cars and the like, and as scenery water, for example as moat water.

Under such circumstances, water treatment with ozone is regarded as an effective means for overcoming the aforementioned problems. The water treatment with ozone has the advantages of being stable and being easily controlled by electric means. This water treatment process, however, has problems of increased treatment cost due to the need for additional facilities and requiring sufficient space for the construction of a large reaction tank. As a consequence, when opting to use this process for water treatment, a purification plant will be confronted with serious problems of large construction costs and significant space requirements for the construction. Because of these problems, various modifications of the conventional ozone process have been proposed in order to materially reduce the size of the reaction tank, i.e., to improve efficiency of the reaction.

It is known that the oxidation reaction by ozone in water comprises the direct reaction of the ozone molecule and the indirect reactions of hydroxy radicals (OH•) and hydroperoxy radicals ($HO_2$•) which are formed by the self-decomposition of ozone. Since hydroxy radicals have stronger oxidation activity than ozone, efficiency of the water treatment with ozone can be improved by increasing quantity of the hydroxy radicals present. Such an improvement may be attained for example by:

(1) increasing the pH value of water to be treated,
(2) adding $H_2O_2$ to the water to be treated,
(3) irradiating the water to be treated with UV rays,
(4) irradiating the water to be treated with radiation,
(5) irradiating the water to be treated with ultrasonic energy, or
(6) employing a catalyst such as a metal ion or a metal oxide.

As an example of the above technique (6), a process has been disclosed in unexamined published Japanese patent application JP-A-59-186695 in which treatment efficiency of waste water that contains organic reducing materials is improved by the formation of chelate compounds effected by the addition of a metal ion such as of iron, manganese, cobalt or the like. According to the disclosed process, the electron density of the organic reducing materials is increased by converting the materials into chelate compounds to accelerate their reaction with ozone molecules and OH radicals which have high electrophilic reactivities.

The aforementioned techniques (1) to (6) for use in the acceleration of hydroxy radical (OH•) formation are effective in terms of improved reaction efficiency, but have the attendant disadvantage of large cost. The aforementioned metal ion addition process disclosed in JP-A-59-186695 has the added disadvantages of being a process that is effective only for the treatment of waste water which contains organic reducing materials and requires adjustment of the pH value of the waste water to 3 or below. In addition, when a large volume of water such as service water or sewage is treated by this catalytic process, it is necessary to increase the quantity of chemicals added to correspond to the waste water volume. This addition entails increased cost and the extension of facilities, thereby reducing the effectiveness of the process.

SUMMARY OF THE INVENTION

The present invention has been made in view of the above circumstances, and has as an object to provide a process of water treatment with ozone in which the formation of a hydroxy radical (OH•) having a high oxidation activity is accelerated by the addition of a chelate compound, thereby effecting efficient decomposition of trace amounts of organic substances.

A further object of the invention is to provide a process for the treatment of water with ozone in which trace amounts of organic substances contained in water to be treated are oxidized and decomposed by diffusing ozone into the water to be treated which is introduced in a reaction tank, wherein a chelate compound is injected into the water to be treated.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, the process of this invention comprises treating water containing trace amounts of organic substances by diffusing ozone into the water and injecting a chelate compound into the water.

BRIEF DESCRIPTION OF THE DRAWINGS

The accompanying drawings, which are incorporated in and constituted a part of this specification illustrate embodiments of the invention and together with the description, serve to explain the objects, advantages and principles of the invention.

In FIGS. 3 to 6, —○— is a line for EDTA-Na, —□— for EDTA-Ca, —△— for EDTA-Mg and —◇— for EDTA-Fe.

In FIG. 7, in which —○13 is a line for 2-MIB and —□— for geosmin.

DETAILED DESCRIPTION OF THE INVENTION

In accordance with the process of the present invention, a chelate compound is injected into water to be treated after or just before the introduction of the water into a reaction tank, and then the water treatment is carried out by diffusing ozone into the reaction tank.

The process of the present invention can be applied for treating water which contains trace amounts of organic substances such as geosmin, 2-MIB, phenol, cyanide, dyestuffs, etc.

The process of the present invention is performed preferably within the pH of 5 to 10 at 1° to 40° C.

The chelate compound of the present invention can be added in the concentration of $10^{-7}$ to $10^{-4}$ mol/l based on the concentration of the organic substances of $10^{-9}$ to 1 g/l.

The chelating agent of the chelate compound can be ethylenediaminetetraacetic acid, citric acid or the like.

The metal ion of the chelate compound can be selected from the group consisting of sodium, calcium, magnesium and iron.

Preferred chelate compounds are selected from the group consisting of ethylenediaminetetraacetic acid disodium salt, ethylenediaminetetraacetic acid calcium salt, ethylenediaminetetraacetic acid magnesium salt, ethylenediaminetetraacetic acid iron salt, iron citrate and the like.

Preferred ozone introduction ratio (concentration of ozone gas×flow rate of gas×introduction time÷volume of water to be treated) is 0.1 to 100 mg/l.

The process of the present invention is based on the highly efficient formation of hydroxy radicals (OH•) whose oxidation activity is higher than that of ozone. In other words, trace amounts of organic substances are decomposed efficiently by hydroxy radicals (OH•) which are formed efficiently through a chain reaction that comprises a hydroxy radical formation reaction by a chelate compound and ozone and a hydroperoxy radical (HO$_2$•) formation reaction by a chelate compound and hydroxy radical (OH•).

The following describes the self-decomposition reaction of ozone. In purified water, a hydroxy radical (OH•) is formed by the following self-decomposition reaction of ozone.

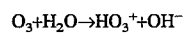

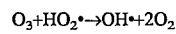

Figure 1:
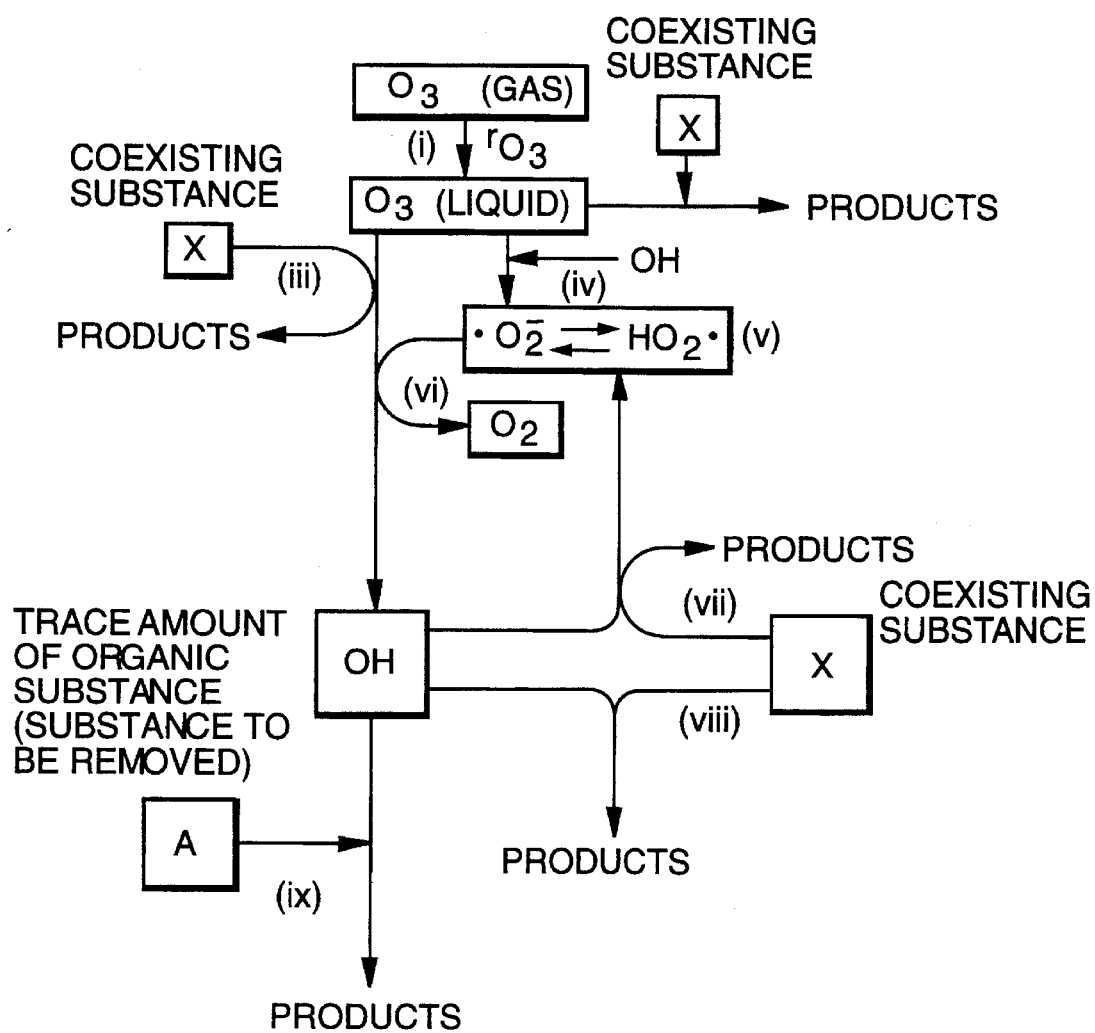
FIG. 1 is a schematic drawing showing a radical chain reaction in the presence of a coexisting substance.

By contrast, when water contains a coexisting substance, hydroxy radical (OH•) is formed according to the radical chain reaction model shown in FIG. 1 and the following radical chain reaction formulae (i) to (ix) which are also encompassed in the reaction model of FIG. 1. In these formulae, X is a coexisting substance, e.g., a chelate compound, and A is a trace amount of an organic substance to be removed.

 (i)

 (ii)
(iii)

 (iv)

 (v)

(vi)

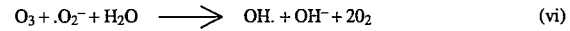 (vii)
(viii)

 (ix)

In the above reaction formulae (i) to (ix), hydroxy radical (OH•) is formed by the reaction of a chelate compound X with dissolved ozone O$_3$ represented by the reaction formula (iii) and by the reactions of (v) and (vi) originated from hydroperoxy radical (HO$_2$•) formed by the reaction of a chelate compound X with hydroxy radical (OH•) represented by the reaction formula (vii). Therefore, according to the water treatment process of the present invention, decomposition of trace amounts of organic substances is carried out efficiently based on the addition of a chelate compound which accelerates formation of the high oxidation activity hydroxy radical (OH•).

The following examples are provided to further illustrate the process of the present invention. The examples illustrate the removal of musty odor substances (2-MIB and geosmin) that cause problems in the area of commercial service water. It is to be understood, however, that the examples are for purpose of illustration only and are not to be construed as limiting.

EXAMPLES

Figure 2:
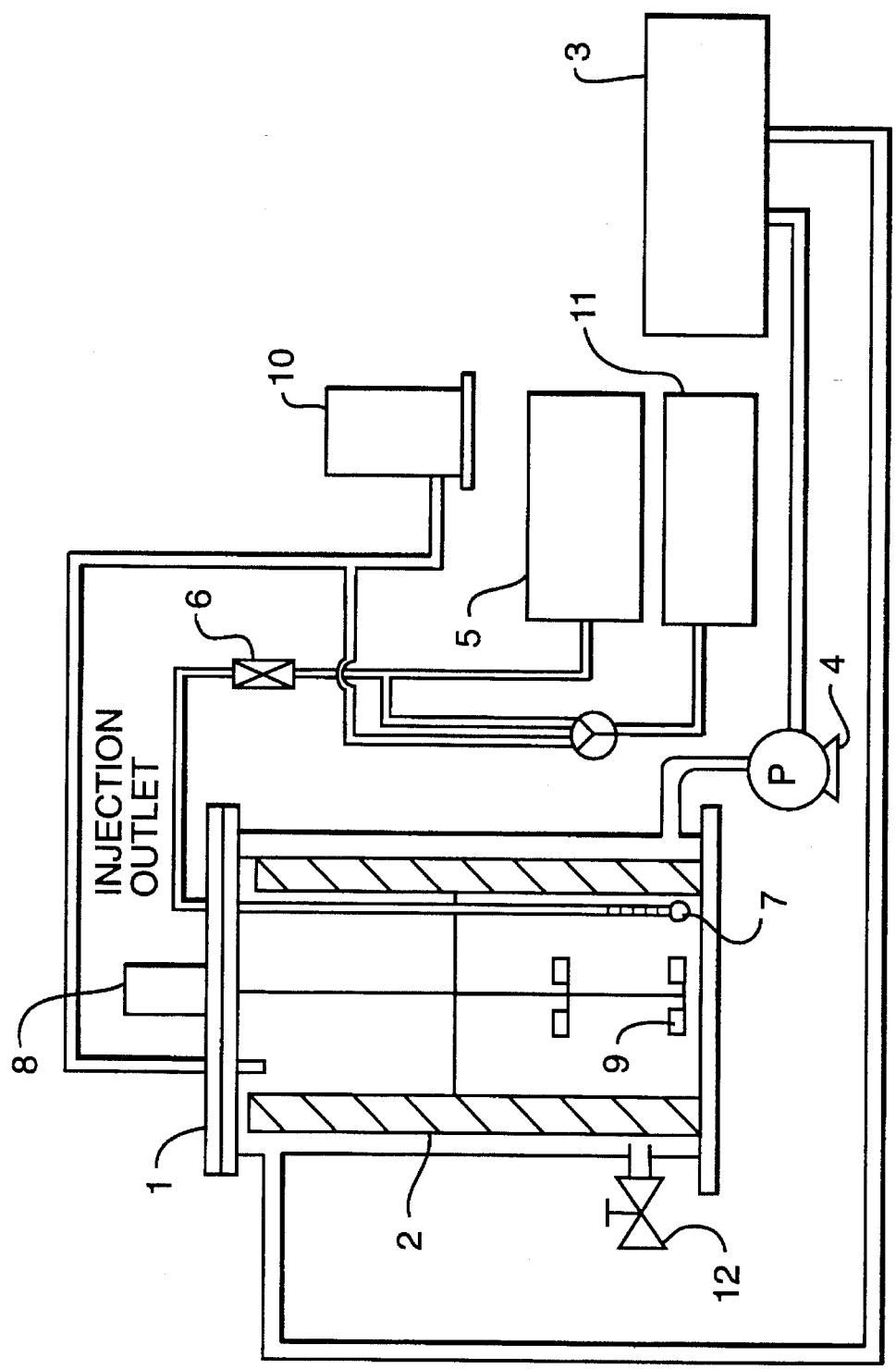
FIG. 2 is a schematic drawing showing an experimental apparatus used in the preferred embodiment of the present invention.

An experimental apparatus used in the tests of the process of the present invention is shown in the partial schematic drawing, FIG. 2. In the figure, a cover-equipped cylindrical reaction tank 1 has a height of about 70 cm and an inside diameter of about 20 cm, thus having an effective capacity of 20 liters. The reaction tank 1 is equipped with a baffle plate 2 on its inner wall. The tank has a double wall structure into which water is circulated from an externally arranged constant-temperature water bath 3 through a pump 4 to control the inside temperature of the reaction tank and maintain it at about 20° C. Ozonized air generated from an ozone generator 5 is passed through a glass ball diffuser 7 via a flow meter 6 and diffused uniformly into the reaction tank 1 while the water being heated is stirred by an agitation motor 8 and an agitation impeller 9. Excess ozone gas which remains after the reaction, is introduced into an exhaust ozone decomposition column 10 and decomposed into oxygen. Concentration of ozone gas is measured by an ozone densitometer 11, and test samples are collected through a sampling outlet 12.

EXAMPLE 1

Water treatment tests were carried out in the following manner using the described experimental apparatus. First, an appropriate volume of phosphate buffer adjusted to a pH of 7 using potassium dihydrogenphosphate and disodium hydrogenphosphate was put in the reaction tank 1. To this was added a standard solution of a commercial preparation of 2-MIB (2-Methylisoborneol Standard manufactured by WAKO PURE CHEMICAL INDUSTRIES, LTD.) dissolved in purified water to an initial concentration of approximately 300 ng/l, followed by the addition of an EDTA complex within the concentration range of $10^{-7}$ to $10^{-4}$ mol/l. Four EDTA complexes were compared including ethylenediaminetetraacetic acid disodium salt (EDTA-2Na), ethylenediaminetetraacetic acid calcium salt (EDTA-Ca), ethylenediaminetetraacetic acid magnesium salt (EDTA-Mg) and ethylenediaminetetraacetic acid iron salt (EDTA-Fe).

The contents in the reaction tank 1 were adjusted to a predetermined temperature by the circulation of water from the constant-temperature water bath 3 and then mixed uniformly by the agitation motor 8 and the agitation impeller 9. Thereafter, ozonized air having a concentration of about 1.7 g/Nm$^3$ generated from the ozone generator 5 was introduced into the reaction tank 1 at a flow rate of 15 l/min. Each test was carried out at a constant ozone introduction ratio (concentration of ozone gas×flow rate of gas×introduction time÷volume of water to be treated). The effects of the addition of the EDTA complexes on the decomposition of 2-MIB are shown in FIG. 3.

Figure 3:
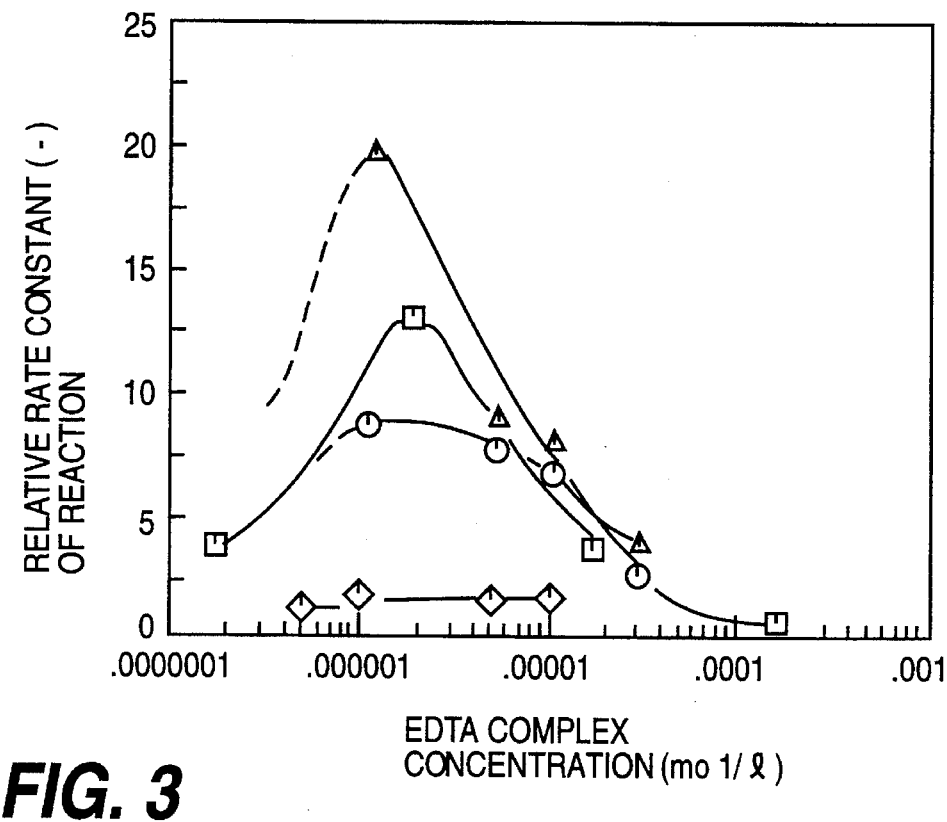
FIG. 3 is a diagram showing the relationship between EDTA complex concentration and the relative rate constant of reaction in the case of 2-MIB.

In FIG. 3, the concentration of EDTA complex is plotted as the abscissa and the relative rate constant of the reaction is plotted as the ordinate. The term "relative rate constant of the reaction" as used herein means a relative value based upon the rate constant of the reaction of a musty odor substance in the absence of an added substance being defined as 1. As a result, a relative rate constant of reaction larger than 1 means that the decomposition of a musty odor substance is accelerated by the added substance. As shown in FIG. 3, the reaction rate of 2-MIB is increased by the addition of the EDTA complexes, with the acceleration effects being about 1.3 times with the addition of EDTA-Fe at a concentration of $5\times10^{-6}$ mol/l, about 8.6 times with EDTA-Na at $1\times10^{-6}$ mol/l, about 13 times with EDTA-Ca at $1.7\times10^{-6}$ mol/l and about 20 times with EDTA-Mg at $1\times10^{-7}$ mol/l.

EXAMPLE 2

In this example, the effects of the addition of EDTA complexes on the decomposition of geosmin were examined. Using the technique as described in Example 1, a standard solution of a commercial preparation of geosmin (Geosmin Standard manufactured by WAKO PURE CHEMICAL INDUSTRIES, LTD.) dissolved in purified water was added to an appropriate volume of phosphate buffer (pH 7) to an initial concentration of approximately 30 μg/l. This was followed by the addition of an EDTA complex within the concentration range of $10^{-7}$ to $10^{-5}$ mol/l. Again, the effects of the four EDTA complexes used in Example 1 were compared. The effects of the addition of the EDTA complexes on the decomposition of geosmin are shown in FIG. 4.

Figure 4:
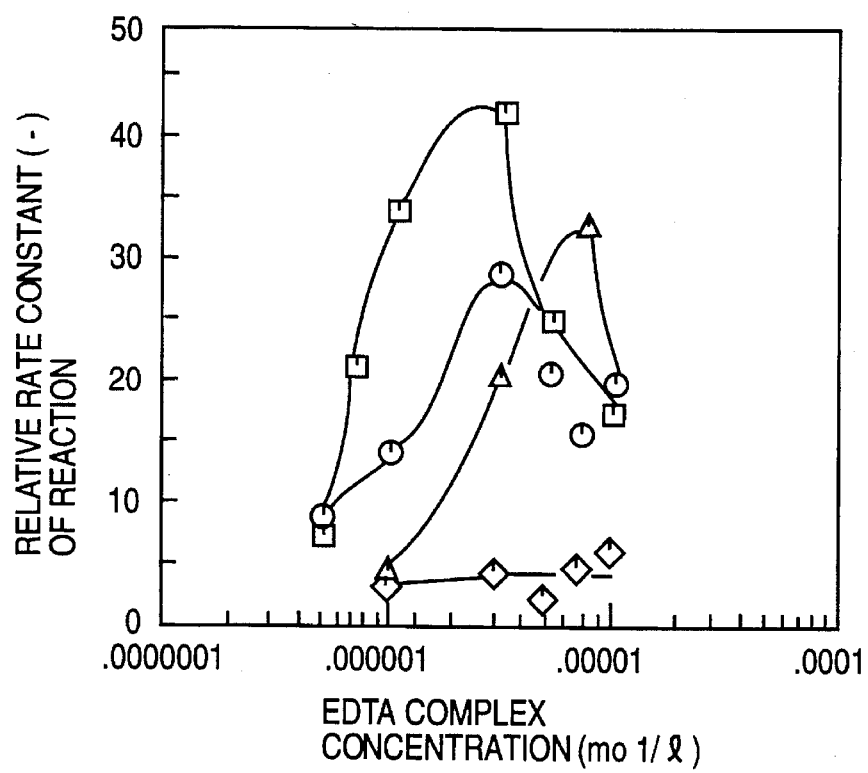
FIG. 4 is a diagram showing the relationship between EDTA complex concentration and the relative rate constant of reaction in the case of geosmin.

In FIG. 4, the concentration of EDTA complex is plotted as the abscissa and the relative rate constant of the reaction as the ordinate. As the results show in FIG. 4, the reaction rate of geosmin is increased by the addition of small amounts of EDTA complexes, with the acceleration effects being about 5 times with the addition of EDTA-Fe at a concentration of $5\times10^{-6}$ mol/l, about 29 times with EDTA-Na at $3\times10^{-6}$ mol/l, about 43 times with EDTA-Ca at $3\times10^{-6}$ mol/l and about 33 times with EDTA-Mg at $7\times10^{-6}$ mol/l.

EXAMPLE 3

In this example, the effects of the addition of EDTA complexes to the supply source of city water were examined. Main water qualities of the samples collected from the surface water layers at Lake Sagami and the Edo River are shown in Table 1. In the table, rate constants of reactions of musty odor substances are shown by defining their corresponding values in the absence of the EDTA complex as 1.

TABLE 1

| Site of sample collection | Lake Sagami | Edo River |
| --- | --- | --- |
| Pretreatment | none | coagulating sedimentation |
| pH | 6.9 | 7.5 |
| TOC* (mg/l) | 3.2 | 1.5 |
| Total carbon concentration (Mg CO$_2$/l) | 31.0 | 30.0 |
| Water temp. for testing (°C.) | 10 | 20 |
| Rate constant of reaction (1/hr) | | |
| Geosmin | 5.9 | 23.9 |
| 2-MIB | — | 17.9 |

*TOC means total organic carbon.

The same standard geosmin solution as used in Example 2 was added to a surface water layer sample collected at Lake Sagami to an initial concentration of approximately 30 mg/ml. This was followed by the addition of EDTA-Na in the range of $8\times10^{-8}$ mol/l to $8\times10^{-5}$ mol/l. The effects of the addition of EDTA-Na are shown in FIG. 5.

Figure 5:
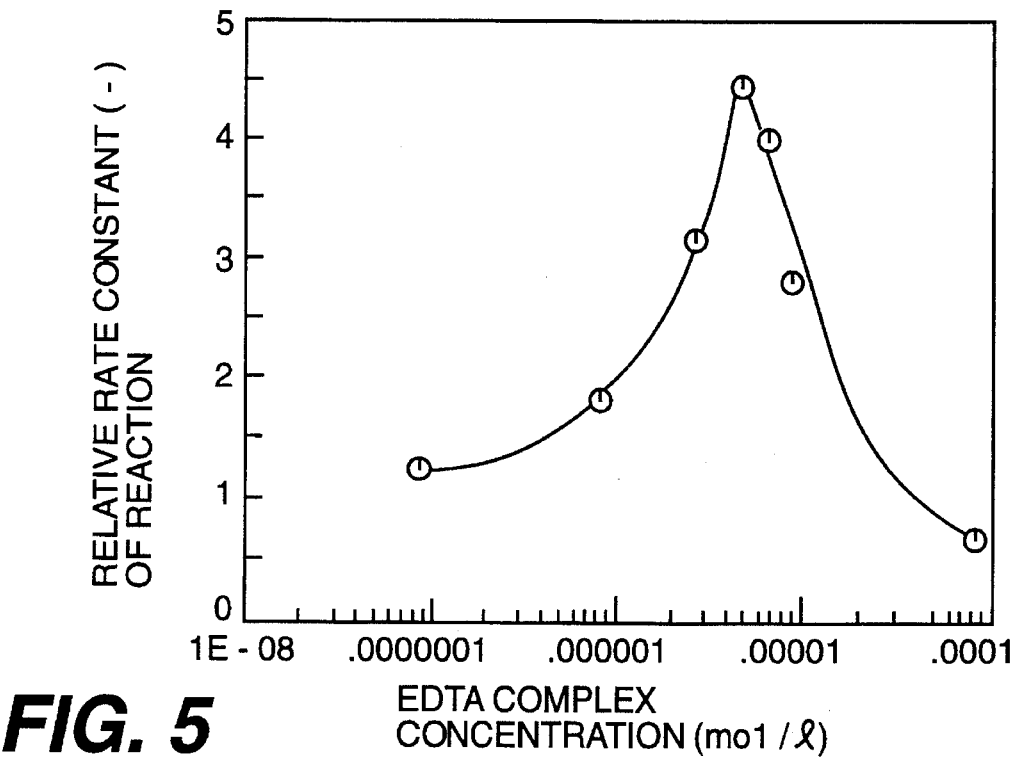
FIG. 5 is a diagram showing the relationship between EDTA-Na complex concentration and the relative rate constant of reaction in the case of geosmin.

In FIG. 5, the concentration of EDTA-Na is plotted as the abscissa and the relative rate constant of reaction as the ordinate. As the results show in FIG. 5, the reaction rate of geosmin is increased by the addition of EDTA-Na, with the acceleration effect being about 4.4 times with the addition of the EDTA complex at a concentration of $4\times10^{-6}$ mol/l.

The same standard 2-MIB solution as used in Example 1 and the same standard geosmin solution as used in Example 2 were added to a surface water layer sample collected at the Edo River, each to an initial concentration of approximately 300 ng/ml. This was followed by the addition of an EDTA complex in the range of $1\times10^{-7}$ mol/l to $3\times10^{-5}$ mol/l. Three EDTA complexes, EDTA-Na, EDTA-Ca and EDTA-Mg, were compared for their effects. The effects of the addition of these EDTA complexes are shown in FIG. 6.

Figure 6:
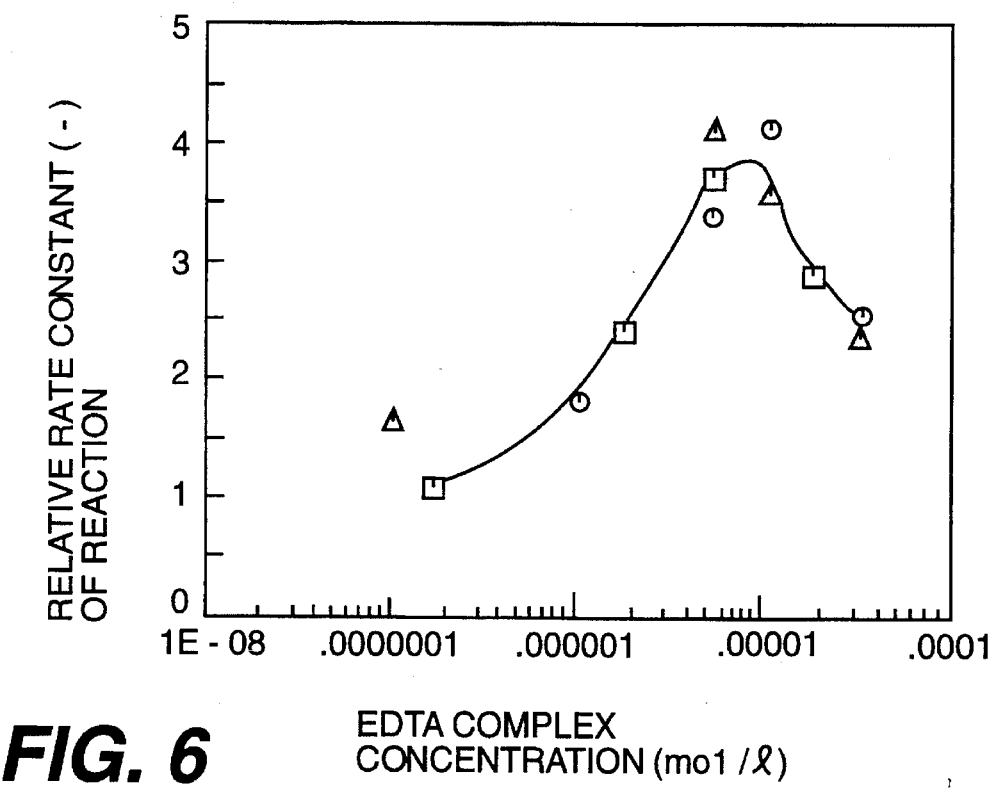
FIG. 6 is a diagram showing the relationship between EDTA complex concentration and the relative rate constant of reaction in the case of 2-MIB and geosmin.

In FIG. 6, the concentration of each EDTA complex is plotted as the abscissa and the relative rate constant of reaction as the ordinate. As the results show in FIG. 6, the reaction rates of geosmin and 2-MIB are increased by the addition of these EDTA complexes, with the acceleration effects being about 4 times with the addition of each of these EDTA complexes at a concentration of $5\times10^{-6}$ mol/l to $1\times10^{-5}$ mol/l.

EXAMPLE 4

In this example, the effects of the addition of a citrate complex to purified water were examined. The same standard solutions of geosmin and 2-MIB as used in Examples 1 and 2 were added to the phosphate buffer (pH 7) used in Examples 1 and 2, each to an initial concentration of approximately 300 ng/ml. This was followed by the addition of iron citrate in the range of from about 0.005 mg/l to 47 mg/l. The effects of the addition of iron citrate are shown in FIG. 7.

Figure 7:
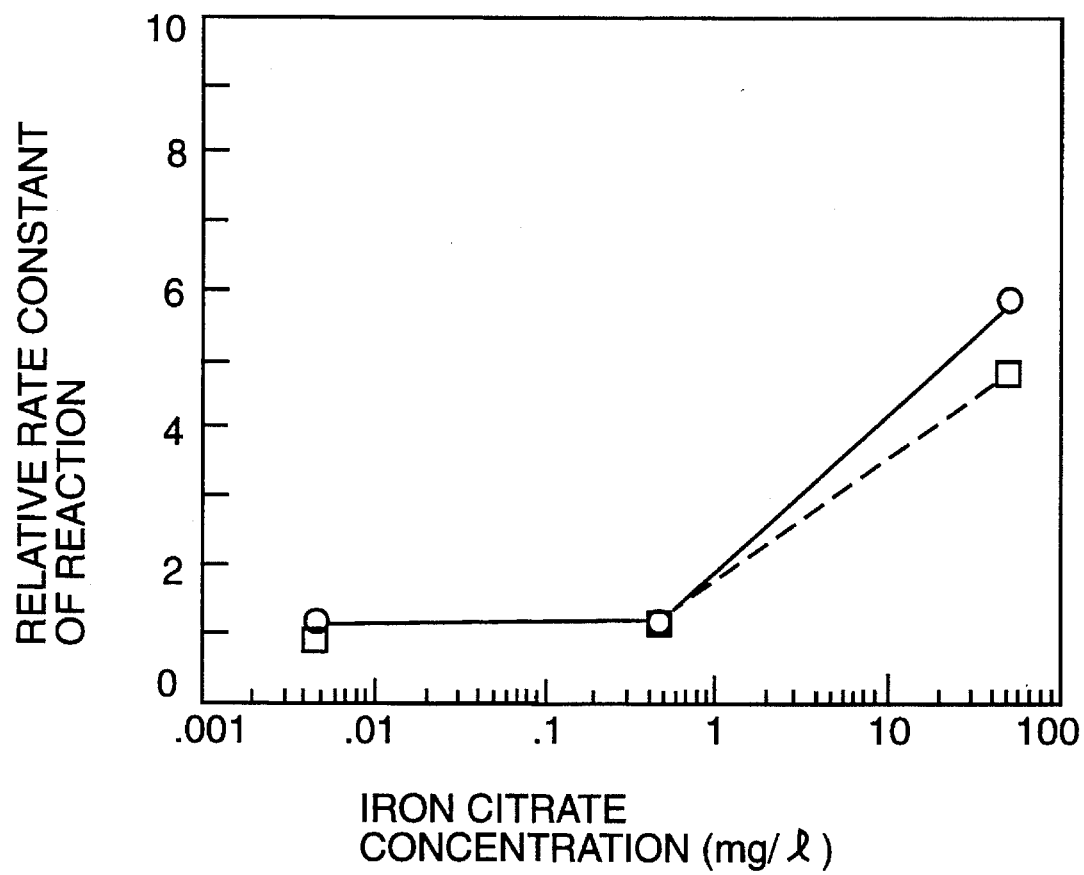
FIG. 7 is a diagram showing the relationship between iron citrate concentration and the relative rate constant of reaction in the case of 2-MIB and geosmin.

In FIG. 7, the concentration of iron citrate is plotted as the abscissa and the relative rate constant of reaction as the ordinate. As the results show in FIG. 7, the reaction rates of geosmin and 2-MIB are increased by the addition of iron citrate, with the acceleration effect being about 5 to 6 times with the addition of the iron citrate at a concentration of about 47 mg/l.

As exemplified above, in the process of the present invention, trace amounts of organic substances such as musty odor substances are decomposed efficiently by the action of the hydroxy radical (OH•) which is formed efficiently through a chain reaction that comprises a hydroxy radical (OH•) formation reaction by a chelate compound and ozone and a hydroperoxy radical ($HO_2$•) formation reaction by a chelate compound and hydroxy radical (OH•). This process overcomes the problems of the aforementioned prior art process disclosed in JP-A-59 -186695, as it can treat any type of water without limitation and it does not require pH adjustment of water to be treated. In other words, the process of the present invention has the advantage that it can be carried out with no pre-treatment and no after-treatment.

Though the effects of the process of the present invention have been exemplified only in the case of service water, the same effects, as well as acceleration of the reduction of COD, BOD and the like, can be obtained when the inventive process is applied to the treatment of sewage. COD and BOD mean chemical oxygen demand and biochemical oxygen demand, respectively. The targets to be decomposed by the inventive process are trace amounts of organic substances including musty odor substances.

Since qualities of raw water may sometimes exert influence on the effects of the addition of a chelate compound, it is necessary to select an effective concentration of the chelate compound. In addition, a chelate compound should be added to raw water prior to the ozone treatment. Raw water should not contain residual oxidants at the time of the addition of a chelate compound, and oxidation, adsorption and the like treatments should not be employed between addition of the chelate compound and the ozone treatment.

As has been described in the foregoing, according to the process of the present invention, a chelate compound introduction apparatus is arranged with an ozone treatment system. The chelate compound is injected into the water to be treated, thereby making possible the accelerated decomposition of trace amounts of unspecified organic substances such as musty odor substances and the like contained in service water and COD- and BOD-related substances and the like contained in sewage. As a result, the inventive process can minimize the size of the necessary reaction tank and thus can reduce the area for the facility site.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A process for treating water with hydroxy radicals comprising introducing water containing trace amounts of organic substances into a reaction tank, injecting said water with a chelate compound before or after said water is introduced into said reaction tank, and diffusing ozone into the water introduced into said reaction tank, said chelate compound being injected in an amount effective to accelerate formation of hydroxy radicals from decomposition of said ozone so as to oxidize and decompose said trace amounts of organic substances.

2. The process according to claim 1, wherein said chelate compound includes a metal ion, where the metal in said metal ion is selected from the group consisting of sodium, calcium, magnesium and iron.

3. The process according to claim 1, wherein said chelate compound is added in a concentration of $10^{-7}$ to $10^{-4}$ mol/l.

4. The process according to claim 1, wherein the chelating agent of said chelate compound comprises citric acid.

5. The process according to claim 4, wherein said chelate compound includes a metal ion, where the metal in said metal ion is selected from the group consisting of sodium, calcium, magnesium and iron.

6. The process according to claim 1, wherein the chelating agent of said chelate compound comprises ethylenediaminetetraacetic acid.

7. The process according to claim 6, wherein said chelate compound is added in a concentration of $10^{-7}$ to $10^{-4}$ mol/l.

8. The process according to claim 6, wherein said chelate compound includes a metal ion, where the metal in said metal ion is selected from the group consisting of sodium, calcium, magnesium and iron.

9. The process according to claim 1, further comprising introducing said water to be treated into a reaction tank prior to injection of said chelate compound.

10. The process according to claim 9, wherein the chelating agent of said chelate compound comprises citric acid.

11. The process according to claim 9, wherein said chelate compound includes a metal ion, where the metal in said metal ion is selected from the group consisting of sodium, calcium, magnesium and iron.

12. The process according to claim 9, wherein the chelating agent of said chelate compound comprises ethylenediaminetetraacetic acid.

13. The process according to claim 12, wherein said chelate compound is added in a concentration of $10^{-7}$ to $10^{-4}$ mol/l.

14. The process according to claim 1, further comprising injecting said chelate compound into water to be treated just before the introduction of said water into said reaction tank.

15. The process according to claim 4, wherein the chelating agent of said chelate compound comprises citric acid.

16. The process according to claim 14, wherein said chelate compound includes a metal ion, where the metal in said metal ion is selected from the group consisting of sodium, calcium, magnesium and iron.

17. The process according to claim 14, wherein the chelating agent of said chelate compound comprises ethylenediaminetetraacetic acid.

18. The process according to claim 17, wherein said chelate compound is added in a concentration of $10^{-7}$ to $10^{-4}$ mol/l.

* * * * *